(12) United States Patent  
Nissen

(10) Patent No.: US 10,968,128 B2  
(45) Date of Patent: Apr. 6, 2021

(54) POWER GENERATION PROCESS

(71) Applicant: Applied Biomimetic A/S, Nordborg (DK)

(72) Inventor: Steen Søndergaard Nissen, Ellicott City, MD (US)

(73) Assignee: APPLIED BIOMIMETIC A/S, Nordborg (DK)

(*) Notice: Subject to any disclaimer, the term of this patent is extended or adjusted under 35 U.S.C. 154(b) by 96 days.

(21) Appl. No.: 16/082,185

(22) PCT Filed: Mar. 2, 2017

(86) PCT No.: PCT/EP2017/054973  
§ 371 (c)(1),  
(2) Date: Sep. 4, 2018

(87) PCT Pub. No.: WO2017/149102  
PCT Pub. Date: Sep. 8, 2017

(65) Prior Publication Data  
US 2020/0255311 A1  Aug. 13, 2020

Related U.S. Application Data

(60) Provisional application No. 62/303,639, filed on Mar. 4, 2016.

(30) Foreign Application Priority Data

Mar. 24, 2016  (GB) .................................... 1605070

(51) Int. Cl.  
*C02F 3/28* (2006.01)  
*B01D 61/00* (2006.01)  
(Continued)

(52) U.S. Cl.  
CPC .......... *C02F 3/2893* (2013.01); *B01D 61/005* (2013.01); *C02F 1/445* (2013.01);  
(Continued)

(58) Field of Classification Search  
CPC ...... B01D 71/12; B01D 69/10; B01D 61/025; B01D 61/58; B01D 61/002; B01D 2311/2669; C02F 1/445  
See application file for complete search history.

(56) References Cited

U.S. PATENT DOCUMENTS

2002/0178723 A1  12/2002  Bronicki et al.  
2006/0225420 A1*  10/2006  Al-Mayahi ............. F03G 7/005  
60/645  
(Continued)

FOREIGN PATENT DOCUMENTS

AU  2007319995  8/2012  
CN  1853044  10/2006  
(Continued)

OTHER PUBLICATIONS

Search Report dated Sep. 14, 2016 by the Intellectual Property Office for Application No. GB1605070.0, 19 pages.  
(Continued)

*Primary Examiner* — Shafiq Mian  
(74) *Attorney, Agent, or Firm* — Jackson Walker LLP; Christopher J. Rourk

(57) ABSTRACT

A process for the generation of power is disclosed. The process comprises receiving a wastewater stream containing organic matter and passing the wastewater stream to an anaerobic digester in which the organic matter contained therein is broken down to produce biogas. The liquid content of said wastewater stream is reduced before said stream enters the anaerobic digester by passing the wastewater stream through an osmotic power unit. The said stream is  
(Continued)

passed over one side of a semi-permeable membrane which permits the passage of water but not the passage of salts, an aqueous stream of higher salinity than said wastewater stream being passed over the other side of said membrane such that latent osmotic energy present in said aqueous stream of higher salinity is converted into electricity.

17 Claims, 7 Drawing Sheets

(51) Int. Cl.
C02F 1/44 (2006.01)
C02F 11/04 (2006.01)
F03G 7/04 (2006.01)
C02F 101/30 (2006.01)

(52) U.S. Cl.
CPC ............... C02F 11/04 (2013.01); F03G 7/04 (2013.01); C02F 2101/30 (2013.01); C02F 2303/10 (2013.01)

(56) References Cited

U.S. PATENT DOCUMENTS

| | | | |
|---|---|---|---|
| 2009/0032446 | A1* | 2/2009 | Wiemers .............. C02F 9/00 210/85 |
| 2010/0024423 | A1 | 2/2010 | McGinnis et al. |
| 2010/0071366 | A1 | 3/2010 | Klemencic |
| 2010/0140162 | A1 | 6/2010 | Jangbarwala |
| 2010/0192575 | A1 | 8/2010 | Al-Mayahi et al. |
| 2010/0282656 | A1 | 11/2010 | Cath et al. |
| 2011/0044824 | A1 | 2/2011 | Kelada |
| 2011/0046074 | A1 | 2/2011 | Kumar et al. |
| 2011/0272166 | A1* | 11/2011 | Hunt .................. E21B 43/40 166/402 |
| 2013/0232973 | A1 | 9/2013 | McBay |
| 2013/0318870 | A1 | 12/2013 | Lim |
| 2014/0026567 | A1* | 1/2014 | Paripati ............... F03G 6/001 60/641.1 |
| 2014/0102095 | A1 | 4/2014 | Shim et al. |
| 2014/0138313 | A1 | 5/2014 | Sato |
| 2014/0138956 | A1 | 5/2014 | Sano et al. |
| 2014/0284929 | A1* | 9/2014 | Taniguchi ............ B01D 61/002 290/54 |
| 2014/0319056 | A1 | 10/2014 | Fuchigami et al. |
| 2015/0352497 | A1 | 12/2015 | Sakai et al. |
| 2016/0002073 | A1* | 1/2016 | Nowosielski-Slepowron ............. B01D 61/58 210/644 |

FOREIGN PATENT DOCUMENTS

| | | |
|---|---|---|
| CN | 103547798 | 1/2014 |
| CN | 203505325 | 4/2014 |
| DE | 102009014576 | 9/2010 |
| JP | 2012-170836 A | 9/2012 |
| JP | 2013-013888 A | 1/2013 |
| JP | 2014061487 | 4/2014 |
| JP | 2014117653 | 6/2014 |
| JP | 2015-016392 A | 1/2015 |
| JP | 2019-508240 A | 3/2019 |
| KR | 10-1286044 | 7/2013 |
| WO | 2004/011600 | 2/2004 |
| WO | 2005/017352 | 2/2005 |
| WO | 2010/091078 | 8/2010 |
| WO | 2012/133661 | 10/2012 |
| WO | 2012/140659 | 10/2012 |
| WO | 2013/033082 | 3/2013 |
| WO | 2013/043118 | 3/2013 |
| WO | 2013/090901 | 6/2013 |
| WO | 2013/164541 | 11/2013 |
| WO | 2014/126925 | 8/2014 |
| WO | 2015/058109 | 4/2015 |
| WO | 2015104957 | 7/2015 |

OTHER PUBLICATIONS

O'Hern et al., "Selective Ionic Transport through Tunable Subnanometer Pores in Single-Layer Graphene Membranes", Nano Letter, American Chemical Society, 2014, pp. 1234-1241, vol. 14.

Cohen-Tanugi et al., "Water Desalination across Nanoporous Graphene", Nano Letter, American Chemical Society, 2012, pp. 3602-2308, vol. 12.

Helfer et al., "Osmotic power with Pressure Retarded Osmosis: Theory, performance and trends—A review", Journal of Membrane Science, 2014, pp. 337-358, vol. 453.

Lin et al., "Hybrid Pressure Retarded Osmosis-Membrane Distillation System for Power Generation from Low-Grade Heat: Thermodynamic Analysis and Energy Efficiency", Environmental Science & Technology, American Chemical Society, 2014, pp. 5306-5313, vol. 48.

The International Search Report and Written Opinion issued by the European Patent Office dated Apr. 11, 2016 for International Application No. PCT/EP2015/070431.

The International Preliminary Report on Patentability issued by the European Patent Office dated Mar. 14, 2017 for International Application No. PCT/EP2015/070431.

The Combined Search and Examination Report issued by UK Intellectual Property Office dated Feb. 24, 2015 for UK Patent Application No. GB 1415847.1.

McGinnis et al., "A Novel Ammonia-Carbon Dioxide Osmotic Heat Engine for Power Generation", Journal of Membrane Science, 2007, pp. 13-19, vol. 305.

Office Action dated Jan. 26, 2021 by the Japanese Patent Office for co-pending Japanese Patent Application No. JP2018-545658, 4 pages.

Pending Claims in the Japanese Patent Office dated Jan. 26, 2021, for co-pending Japanese Patent Application No. JP2018-545658, 3 pages.

* cited by examiner

POWER GENERATION PROCESS

RELATED APPLICATIONS

The present application claims benefit of and priority to U.S. provisional patent application 62/303,639, filed Mar. 4, 2016, Great Britain Patent Application 1605070.0, filed Mar. 24, 2016 and PCT/EP2017/054973, filed Mar. 2, 2017, each of which is hereby incorporated by reference for all purposes, as if set forth herein in its entirety.

FIELD OF INVENTION

The invention relates to a process for the generation of power. Specifically, it relates to power generation using wastewater and saline streams.

BACKGROUND OF THE INVENTION

Much effort is currently being directed towards novel and renewable sources of energy which do not rely on fossil fuels.

One area of renewables research is the field of biogas in which combustible gas (for example methane) is produced by the breakdown of organic matter in the absence of oxygen. The combustible gases may then be used as an energy source. Sources of organic matter may include wastewater from industrial and/or municipal sources, for example sewage.

Another such area of research is the process known as pressure retarded osmosis (PRO). In this process, a semi-permeable membrane is used to separate a less concentrated solution from a more concentrated solution. The membrane causes solvent to pass from the less concentrated solution (with low osmotic pressure) to the more concentrated solution (with high osmotic pressure) by osmosis, and this leads to an increase in pressure on the side of the membrane to which the solvent diffuses. This pressure can be harnessed to generate electricity. A small number of PRO plants are in operation around the world, and these generally use differences in salinity as the driver for osmosis, typically using fresh water from a river or lake as the feed stream for the less concentrated solution, and sea water for the more concentrated solution. Helfer et al, J. Membrane Sci. 453 (2014) 337-358 is a review article describing PRO. Typically, PRO schemes to date have used seawater and river water mixing, and in pilot-scale plants the process has been found to be uneconomic due to low power densities achieved. It has been suggested that a power density of around 5 W/m$^2$ of membrane represents a level of power generation above which PRO may become economically viable. Outside of laboratories it has not generally been possible to achieve this level of power density using existing membrane technology in river/seawater mixing schemes.

A number of attempts have been made to harness the energy found in underground formations in processes involving osmosis. WO 2013/164541 describes a method for generating power by direct osmosis, in which the more concentrated solution is "production water", while the less concentrated solution is fresh water or sea water. Production water is water obtained after separation from a hydrocarbon stream during hydrocarbon production. WO 2013/164541 also mentions that a brine stream obtained from an underground formation can be used as the more concentrated solution.

No known process, however, harvests the maximum available amount of energy latent in the saline streams and/or wastewater streams. We have now found a process capable of increasing the efficiency of energy extraction from saline streams and wastewater streams.

SUMMARY OF THE INVENTION

In one aspect, the present invention provides a process for the generation of power, the process comprising the steps of:
receiving a wastewater stream containing organic matter,
passing the wastewater stream to an anaerobic digester in which the organic matter contained therein is broken down to produce biogas, and wherein the liquid content of said wastewater stream is reduced before said stream enters the anaerobic digester by passing the wastewater stream through an osmotic power unit in which said stream is passed over one side of a semi-permeable membrane which permits the passage of water but not the passage of salts, an aqueous stream of higher salinity than said wastewater stream being passed over the other side of said membrane such that latent osmotic energy present in said aqueous stream of higher salinity is converted into electricity.

In another aspect, the present invention provides a power generation system comprising:
a connection to a wastewater stream,
a connection to a saline stream,
a biogas power unit arranged to generate power by breaking down a sludge in an anaerobic digester, and
an osmotic power unit arranged to generate electricity through Pressure Retarded Osmosis (PRO) using the difference in salinity between the saline stream and the wastewater stream, and wherein
the system is arranged such that the concentrated wastewater stream output by the osmotic power unit is passed to the biogas power unit for use as the sludge.

In another aspect, the present invention provides a process for the generation of power, the process comprising the steps of:
extracting a warm saline stream from a geothermal formation;
obtaining a wastewater stream containing organic matter;
converting thermal energy present in the warm saline stream into electricity and/or using the thermal energy present in the warm saline stream to increase the temperature of the wastewater stream;
converting latent osmotic energy present in said saline stream into electricity and reducing the water content of said wastewater stream by using (i) the wastewater as the low salinity feed stream of an osmotic power generation process and (ii) the saline stream as the high salinity feed stream of the osmotic power generation process; and
sending the concentrated wastewater resulting from the osmotic power generation process to anaerobic digesters in which biogas is generated from the breakdown of organic matter contained in said wastewater.

DETAILED DESCRIPTION OF INVENTION

Figure 1:
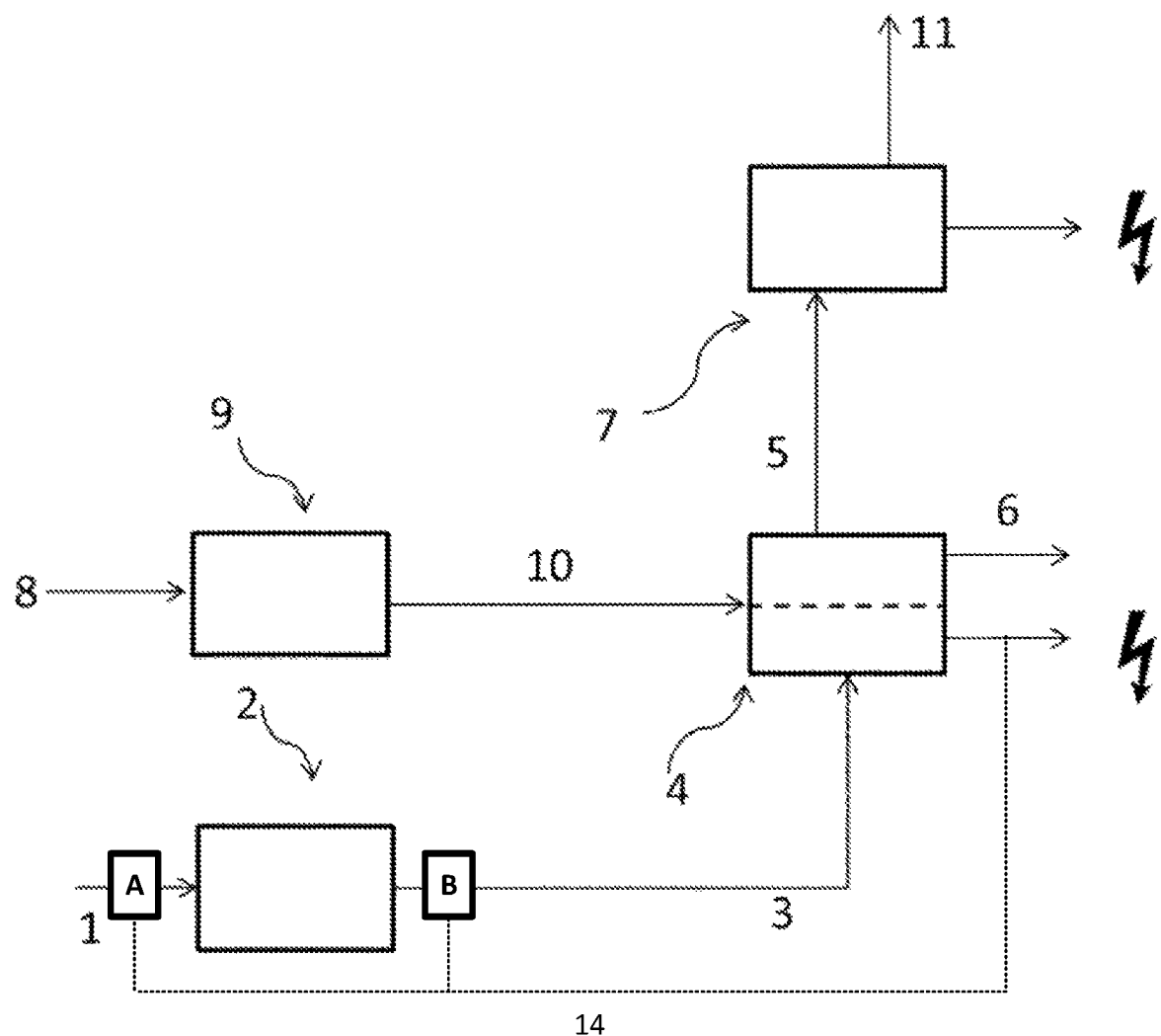
FIG. 1 shows a schematic view of one embodiment of the invention in which a wastewater stream is passed first through an osmotic power unit and then into a biogas power unit.

The process of the present invention may increase the efficiency of energy generation using wastewater streams. The process of the present invention uses wastewater as the lower salinity stream in an osmotic power generation process, prior to decomposing the organic matter present in the wastewater stream to produce biogas. This sequence of wastewater use helps to increase the efficiency of the biogas process.

Industrial and/or domestic wastewater, for example sewage provides a useful source of organic material for use in the biogas generation process. However, the relatively low amount of organic material present in most wastewater as compared to the liquid component means that energy production per unit volume of wastewater is relatively low.

As well as the increase in efficiency that may be expected by including additional power generation means (an osmotic power unit and/or thermal power unit) into a biogas process, the processes of the present invention complement each other to produce further efficiencies in the wastewater treatment process.

Using the wastewater as the low-salinity feed stream of an osmotic power unit reduces the water content of the wastewater as a natural consequence of the osmotic power generation process (i.e. the migration of water across the semi-permeable membrane). This increases the concentration of organic matter in the wastewater and thereby increases the amount of energy per unit volume of wastewater than can be produced. The efficiency of the biogas process is increased as the time and/or energy required to concentrate the wastewater using other means is correspondingly reduced.

Where the high salinity feed of the osmotic power generation process is a warm saline stream extracted from a geothermal source, the heat energy present in the warm saline stream may be used to increase the temperature of the wastewater which may also increase the efficiency of the biogas process by increasing reaction rates.

The process of the invention uses a wastewater stream. The wastewater stream may be any industrial or municipal wastewater steam containing organic matter. For example, the wastewater stream may be sewage or wastewater from industrial processes, for example from dairies, breweries, bio-tech or food manufacturers, having a high organic, for example protein, content. The solids content of the wastewater stream is typically in the range of 0.5% wt to 1.5% wt. In some circumstances the solids content of the wastewater stream may be up to 5% wt. Passing the wastewater stream through the osmotic power unit may increase the solids fraction by a factor of two or more. The solids content of the wastewater stream after passing through the osmotic power unit may be in the range of 4 to 8% wt. The solids content of the wastewater stream after passing through the osmotic unit may be at least 4% wt, preferably at least 6% wt, preferably at least 8% wt. The solids content of the wastewater stream after passing through the osmotic power unit may be up to 10% wt.

A biogas power unit may be defined as a unit that breaks down organic matter in the absence of oxygen to produce combustible gases, in particular methane, for use as fuel. Any suitable biogas power unit may be used in the process of the present invention. The key feature of such a unit is the presence of an anaerobic digester in which the organic matter is decomposed. Such anaerobic digesters are commercially available, and any suitable type may be used, for example batch or continuous, single or multistage, mesophilic or thermophilic. As well as an anaerobic digester a biogas power unit may include means for converting biogas into electricity. Typically this means will be an internal combustion engine, for example a turbine connected to a generator, but any suitable means may be used.

The input to the biogas power unit may be a concentrated wastewater stream known as sludge. The solid content of the sludge may be in the range of 4 to 8% wt. The solid content of the sludge may be at least 4% wt, preferably at least 6% wt, preferably at least 8% wt. The solid content of the sludge may be up 10% wt. The present invention uses an osmotic power generation process to reduce the water content of the wastewater stream. Depending on the process parameters and properties of the streams involved, and the desired properties of the sludge, further processing of the wastewater stream may be required to convert the wastewater into sludge following passage through the osmotic power unit.

The process of the invention uses a saline stream. The saline stream may be obtained from a geothermal formation, a salt formation or other high salinity source for example seawater or brine from a desalination plant. The stream is extracted from the ground using conventional techniques for example drilling or solution mining techniques and is generally subject to any required pretreatment steps prior to carrying out osmotic power generation. For example, filtration to remove solid material may be necessary, as might other conventional processes depending on the exact nature of the stream.

The salt content of the saline stream may be anything up to saturation. Preferably the salt content is at least 10% wt, preferably at least 15% wt, especially at least 20% wt, especially at least 25% wt. It will be understood that saline streams may contain a wide variety of dissolved salts, with a preponderance of sodium chloride, and that "salt content" refers to total salt content. The exact nature of the salt(s) present in such streams is not important. Similarly, the terms high(er)-salinity and low(er)-salinity are used herein to refer to streams having a corresponding "salt content"—the exact nature of the salt(s) present in such streams is not important.

An osmotic power unit is a unit which converts latent osmotic energy into electricity using osmosis. Any suitable osmotic power unit may be used in the process of the present invention. The key feature of such a unit is the presence of a semi-permeable membrane which permits the passage of water but not of dissolved salt(s). Such membranes are commercially available, and any suitable membrane may be used. In addition, novel types of membrane, for example membranes based on a lipid or amphiphilic polymer matrix containing aquaporins, which are proteins which permit the passage of water but no other substance, may be used. Such membranes are described in for example WO 2004/011600, WO 2010/091078, US 2011/0046074 and WO 2013/043118. Other novel types of membrane include graphene-based membranes, for example those described by Cohen-Tanugi et al, Nano Lett. 2012, 12(7), pp. 3602-3608 and O'Hern et al, Nano Lett. 2014, 14(3), pp. 1234-1241. More than one membrane may be present, and combinations of different types of membranes may be used. Thus the osmotic power unit may contain more than one osmosis unit each containing a semi-permeable membrane. As well as at least one membrane, an osmotic power unit will include means for converting pressure or flow generated by osmosis into electricity. Typically this means will be a turbine connected to a generator, but any suitable means may be used.

As well as the saline feed stream osmotic power generation requires a feed stream which is an aqueous stream having lower salinity than the saline stream. In the present invention this lower salinity stream is wastewater obtained from an industrial or municipal source, for example sewage. The economics of a process according to the invention are likely to be particularly favorable when a saline source is located adjacent to a wastewater treatment plant. Throughout this specification, unless the context requires otherwise, "lower salinity" should be understood to include zero salinity.

The initial inputs to the osmotic process are thus one higher salinity stream (the saline stream), and one lower salinity stream (wastewater). After passage over a membrane, the first stream (initial higher salinity) will be reduced in salinity, while the second stream (initial lower salinity) will be increased in salinity. The output streams from a first pass over the membrane will both have lower salinity than the original warm saline stream, and higher salinity than the original lower salinity stream—at equilibrium, the two streams would have equal salinity, but this is unlikely to be achieved in practice. Therefore, either output stream can be reused as either the first stream or the second stream for a second pass over the original membrane, or as either the first stream or the second stream over a second membrane. These reused streams may be used alone, or merged with other input streams.

The high concentrations of salt in warm saline streams from geothermal formations may facilitate the use of multi-step osmotic power generation. Each step may have a different pressure and/or flux setting depending on the difference in salinity between the initial input streams for each pass. Tailoring the pressure and/or flux setting in this manner may increase the efficiency of the process, particularly where a plurality of steps may be used as with a warm saline stream from a geothermal formation. As long as an outgoing stream from an osmosis unit has higher salinity than the initial input stream of lower salinity, it is possible to operate an additional osmosis unit. The optimal number of cycles will depend on the initial content of the streams, the efficiency of the membranes, and the flow rates selected.

The efficiency of the process of the invention will depend upon the initial temperature and pressure of the saline stream, and also upon the quantity and nature of the salt(s) the stream contains. Another key feature determining the efficiency of the process will be the performance of the semi-permeable membrane, and optimization depends on a combination of two factors: the flux of water obtainable through the membrane, and the efficiency with which the membrane can exclude salts. The use of multiple osmosis units as described above can also affect overall process efficiency.

The saline stream may comprise a warm saline stream extracted from a geothermal formation. The geothermal formation may yield a warm saline stream having a temperature of at least 45° C., preferably at least 55° C. For example, the geothermal formation may yield a warm saline stream having a temperature between 45° C. and 70° C.

In the case that the saline stream is a warm saline stream, the process may comprise extracting thermal energy from the stream. The thermal energy of the stream may be used to raise the temperature of the wastewater stream. The thermal energy of the stream may be used to raise the temperature of the wastewater stream before, while or after the wastewater passes through the osmotic power unit. Increasing the temperature of the wastewater stream may increase the efficiency of a subsequent biogas generation process by speeding up reaction times. Conversely, lowering the temperature of the saline stream by transferring thermal energy to the wastewater stream may increase the efficiency of the osmotic membrane. Alternatively, the thermal energy of the warm saline stream may be used to generate electricity.

The thermal energy of the stream may be used to heat the wastewater stream using conductive heat transfer. Conductive heat transfer between the wastewater stream and the saline stream may take place in a heat exchanger, for example via a heat exchanger contained in a thermal power unit. Conductive heat transfer between the wastewater stream and the saline stream may take place in the osmotic power unit, for example across the membrane or via a built-in heat exchanger. Alternatively, the thermal energy of the warm saline stream may be used to generate electricity which is used to indirectly heat the wastewater stream.

The process may comprise transferring thermal energy between (i) a portion of the warm saline stream upstream of the osmotic power unit and (ii) a portion of the wastewater stream downstream of the osmotic power unit.

The present invention may comprise passing the warm saline stream through a thermal power unit. A thermal power unit may be defined as a unit which converts thermal energy into electricity. Any suitable means may be used to convert thermal energy contained in the geothermal stream into electricity. For example, the stream may be passed through a thermal power unit comprising a heat exchanger. Alternatively, particularly where the stream is of very high temperature and high pressure, the thermal power unit may comprise a steam generator. Steam from the geothermal stream may be used directly to drive the steam generator. Conventional means of handling warm streams which may be in either the liquid phase or the gaseous phase or both are well known, and any such means may be used in the present invention. The use of a heat exchanger is preferred in many circumstances, especially where the initial temperature of the warm saline stream emerging from the geothermal formation is less than 150° C. Passing the warm saline stream through the thermal power unit may reduce the temperature of said stream by at least 50%. For example, passing through the thermal power unit may reduce the temperature of the stream from between 45° C. and 70° C. to between 15° C. and 20° C.

In the case that the thermal power unit is located on the flow path between a geothermal formation and the inlet to the osmotic power unit, the output of the thermal power unit is a cooled saline stream, which is passed to the osmotic power unit. The cooler (in comparison to the warm stream from the geothermal formation) saline stream may be better suited to the osmotic power generation process than the warm stream obtained from the geothermal formation. For example, the cooler saline stream may result in an increase in the efficiency of the osmotic membrane and/or the lifetime of the membrane. If the osmotic power unit is located on the flow path between the geothermal formation and the inlet to the thermal power unit, the output of the osmotic power unit is a warm stream of reduced salinity, which is passed to the thermal power unit. The reduction in the salinity of the warm stream which occurs during the osmotic power generation process may mean that the precipitation of solid salts(s) as the temperature drops during the thermal power generation process is reduced thereby reducing fouling and/or increasing the efficiency of the thermal generation process.

One embodiment of the invention is illustrated schematically in FIG. 1. In FIG. 1, a saline stream 1, for example a saline stream extracted from a salt formation using solution mining, is passed through one or more pre-treatment steps 2 and the resulting stream 3 is passed to osmotic power unit 4 where it is caused to flow at one side of a semi-permeable membrane (not shown) which permits passage of water but not of salts. One of ordinary skill will recognize that pumps A and B are typical of pumps at steps/units 3, 5, 6, 8 and so forth, and that conductor 14 or other suitable conductors can be used to provide power and control to such pumps or other suitable gas or liquid motive equipment. A wastewater stream 8 which is of lower salinity than streams 1 and 3, which may for example be sewage, is passed through one or more pre-treatment steps 9 and the resulting stream 10 is passed to osmotic power unit 4 where is it caused to flow at the other side of the semi-permeable membrane. Within osmotic power unit 4, water flows from stream 10 into stream 3 via the semi-permeable membrane causing an increase in pressure due to the increased volume in a confined space, and this excess pressure is ultimately converted to electricity by conventional means not shown. This transfer of water between streams 10 and 3 also reduces the water content of stream 10. Output from the osmotic power unit 4 forms a first exit stream 5 from the wastewater side of the membrane and a second exit stream 6 from the saline side of the membrane. The second exit stream 6 is disposed of as required, for example by re-insertion into the geothermal formation from which stream 1 was extracted or into a water-source, for example sea, river or lake. The first, wastewater, exit stream 5 is passed to a biogas power unit 7 where it flows into an anaerobic digester and is broken down to produce for example methane which is then converted into electricity by conventional means not shown. A digestate stream 11 passes out of the biogas power unit and can be disposed of as required. The saline stream of FIG. 1 may be extracted from a salt formation for example a salt dome or rock salt formation as part of a solution mining process.

Figure 2:
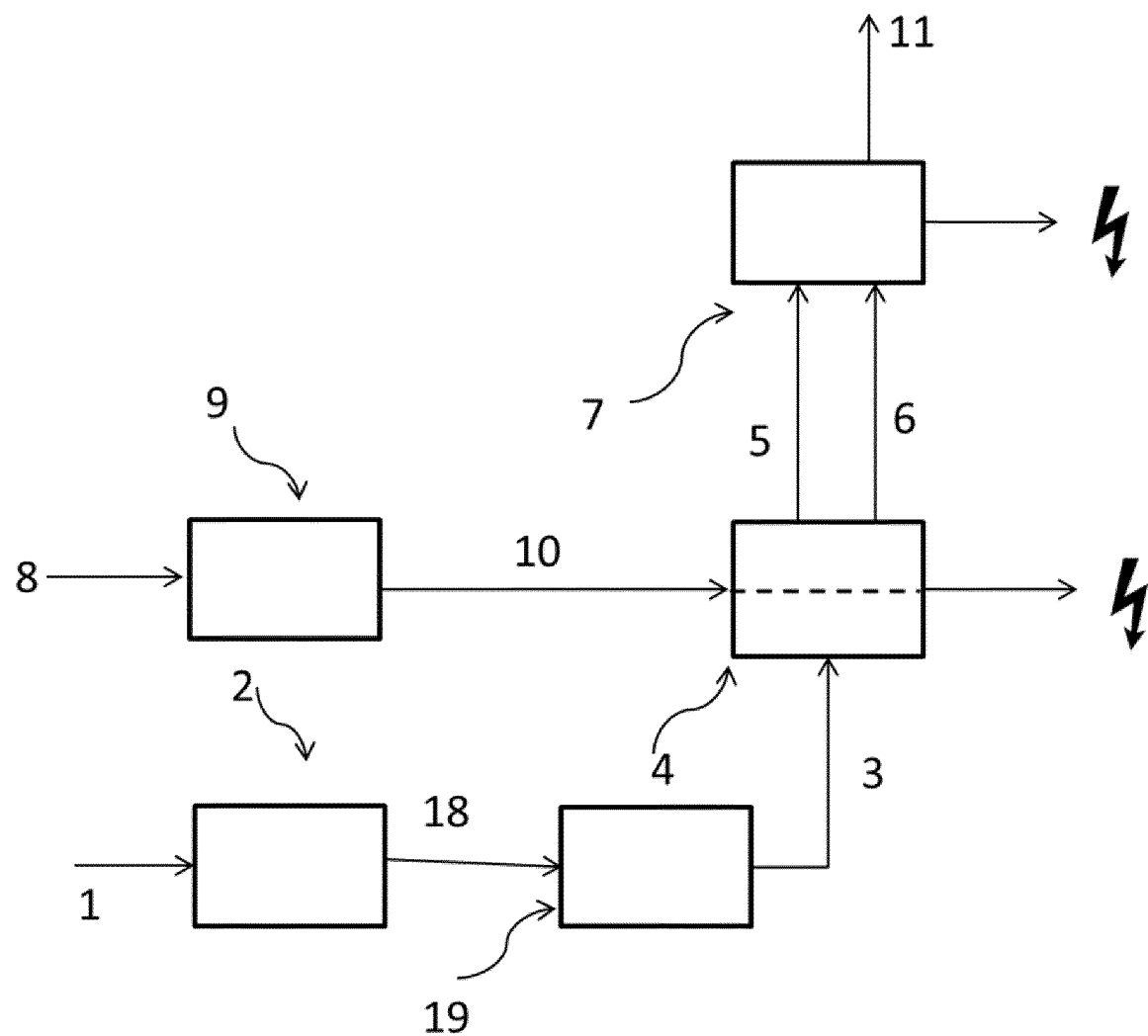
FIG. 2 shows a schematic view of an alternative embodiment of the invention in which a warm saline geothermal stream is passed through a heat exchanger before it is passed through the osmotic power unit.

An alternative embodiment is shown in FIG. 2. Like reference numerals denote like elements. In FIG. 2, a warm saline stream 1 from a geothermal source is passed through one or more pre-treatment steps 2 and the resulting stream 18 is passed to a heat exchanger 19. In the heat exchanger 19, thermal energy is extracted and ultimately converted to electricity by conventional means not shown, and the warm saline stream 18 is cooled and exits as cooled saline stream 3. Stream 3 is passed to osmotic power unit 4 and the remainder of the process is as discussed above for FIG. 1.

In an alternative embodiment, not shown, the warm saline stream is passed through the osmotic power unit first, and then the heat exchanger.

Figure 3:
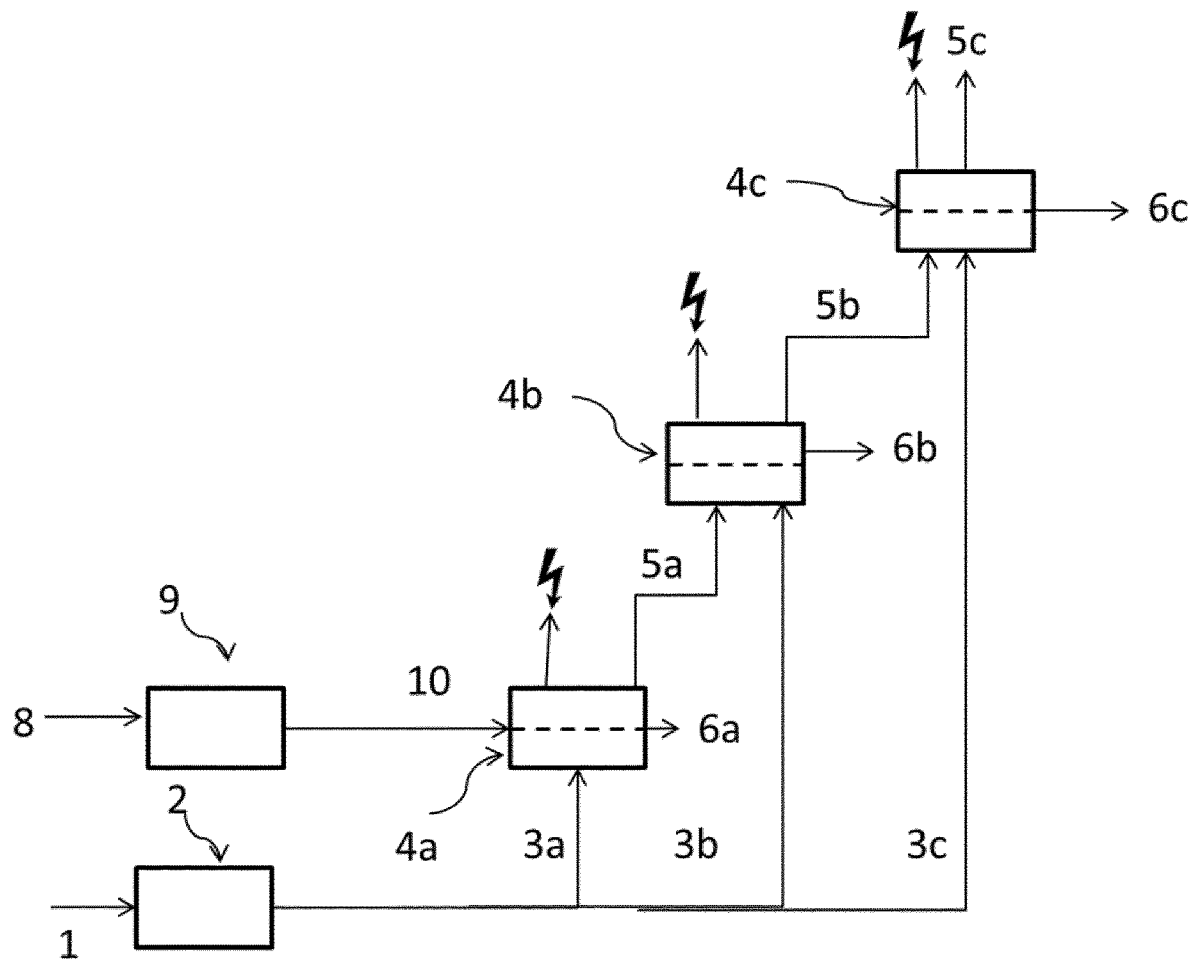
FIG. 3 shows a variant of FIG. 1 in which multiple osmosis units are used.

FIG. 3 shows a variant of the process of FIG. 1 in which the osmotic power unit 4 comprises multiple osmosis units 4a, 4b and 4c connected in series in a power generation system according to the invention. In FIG. 3, similar reference numerals denote similar elements to those shown in FIG. 1. Only those elements of the FIG. 3 embodiment which differ from FIG. 1 will be discussed here. Each osmosis unit 4a, 4b and 4c contains a semi-permeable membrane (not shown) which permits passage of water but not of salts. Original high saline stream 3 flows at one side of the semipermeable membrane, while lower salinity wastewater stream 10 flows at the other side. Output stream 5a from osmosis unit 4a, which has a water content lower than that of original wastewater stream 10, is fed to a second osmosis unit 4b where it is passed over one side of a semi-permeable membrane. A second input stream 3b of high salinity is obtained from saline stream 1 after passage through one or more pretreatment steps 2. Although the difference in salinity between streams 5a and 3b is lower than the difference in salinity between streams 10 and 3a, there is still a difference in salinity, and electricity can be generated by osmosis. Output stream 5b from osmosis unit 4b, which has a higher salt content/lower water content than that of original wastewater stream 8 is fed to a third osmosis unit 4c where it is passed over the other side of a semi-permeable membrane from a further high salinity input stream 3c. Although the difference in salinity between streams 5b and 3c is lower than the difference in salinity between streams 10 and 3, or between streams 5a and 3b, there is still a difference in salinity, and electricity can be generated by osmosis. Output streams from the process of FIG. 3 are high salinity exit streams 6a, 6b, 6c and these streams may be disposed of as required. The final output 5c of the wastewater stream can be passed to the biogas power unit 7 as discussed in FIG. 1.

Figure 4:
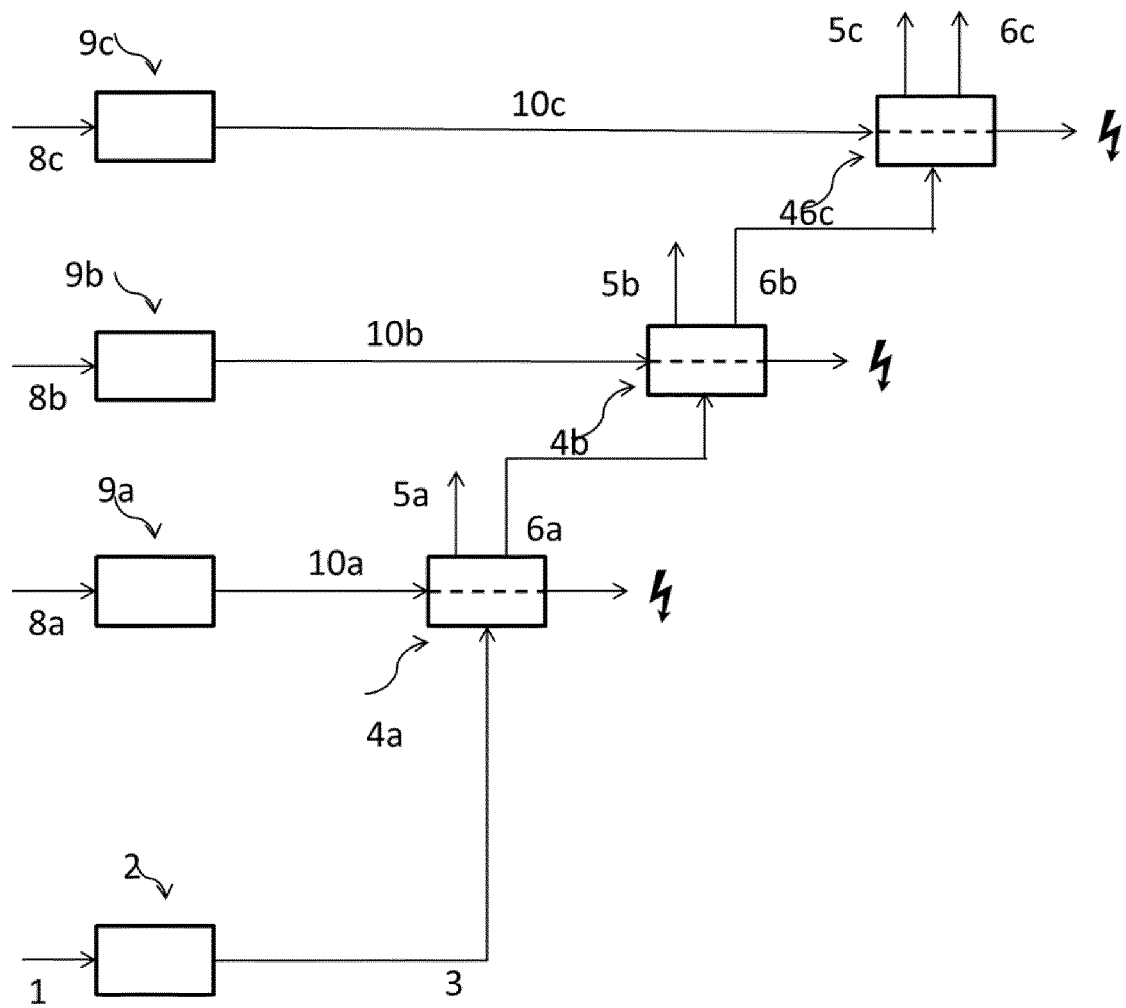
FIG. 4 shows a variant of FIG. 3 with alternative input streams.

FIG. 4 shows a variant of FIG. 3 in which input streams 10a, 10b and 10c of relatively low salinity wastewater are provided as separate input streams 8a, 8b and 8c, each undergoing one or more pre-treatments steps 9a, 9b and 9c. The high salinity output 6a, 6b of each osmosis unit 4a, 4b is fed to the next osmosis unit 4b, 4c for use on the high salinity side of the membrane.

Figure 5:
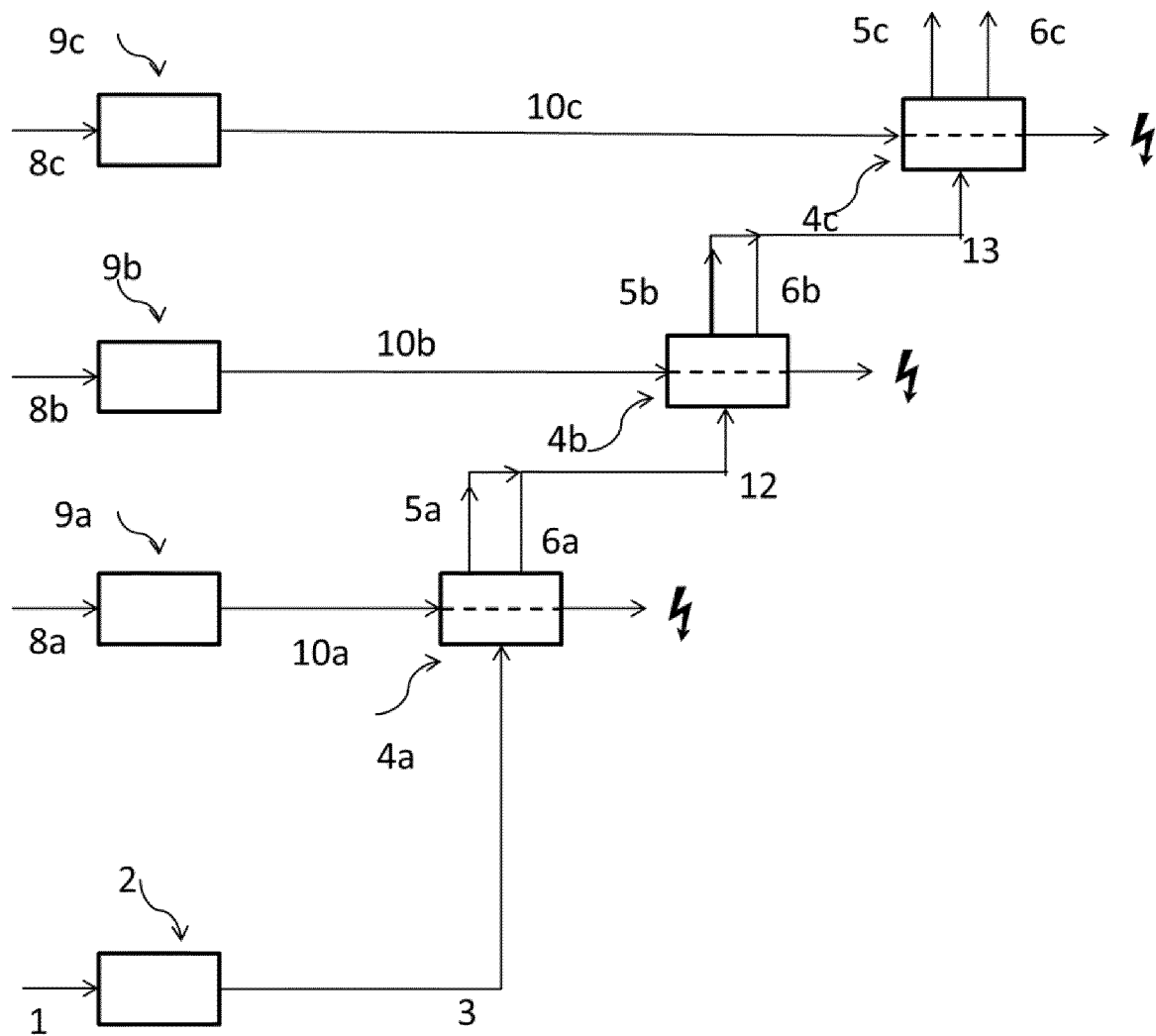
FIG. 5 shows a variant of FIG. 4 with alternative output streams.

FIG. 5 shows a variant of FIG. 4 in which output streams are handled in a different way. Outlet streams 5a and 6a from osmosis unit 4a are merged, and at least part of the merged stream is provided as input stream 12 to osmosis unit 4b. The merged stream 12 will have a salt content lower than that of original input stream 3, and although the difference in salinity between stream 12 and stream 10b is lower than the difference in salinity between streams 3 and 10a, there is still a difference in salinity, and electricity can be generated by osmosis. Similarly, outlet streams 5b and 6b from osmosis unit 4b are merged, and at least part of the merged stream is provided as input stream 13 to osmosis unit 4c. The low salinity output 5c of osmosis unit 4c can then be passed to the biogas power unit 7 as discussed above for FIG. 1.

It will be understood that FIGS. 3, 4 and 5 show an osmosis power unit consisting of 3 osmosis units each containing a semi-permeable membrane, but that any suitable number of units can be used, the choice being determined by a combination of technical and economic factors. In general, the higher the initial salinity of the saline stream 1, the higher the number of osmosis units which may be used.

Figure 6:
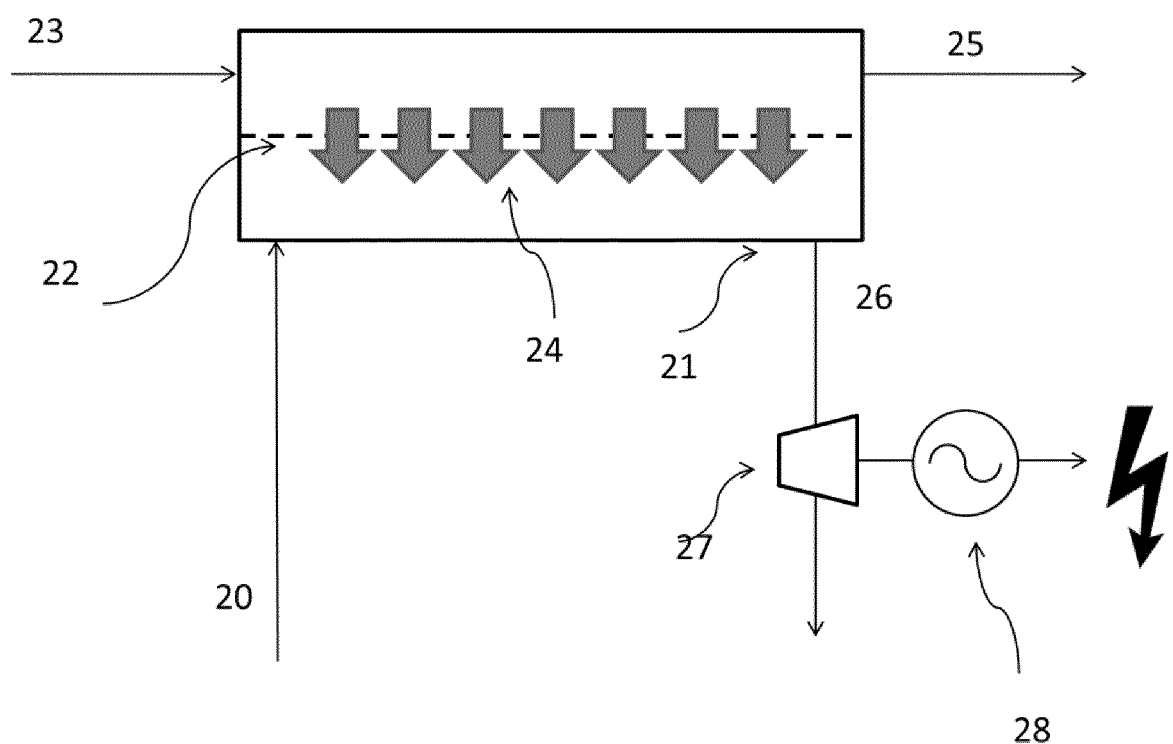
FIG. 6 shows an osmotic power unit.

FIG. 6 shows more details of an osmotic power unit 4 of FIG. 1. A saline input stream 20 for example from a geothermal of salt formation source (which may for example be stream 3 of FIG. 1) is passed to an osmosis unit 21 containing a semi-permeable membrane 22 which permits passage of water but not of salts, and flows at one side of membrane 22. A wastewater stream 23 (which may for example be stream 10 of FIG. 1) which is of lower salinity than stream 20 enters osmosis unit 21 and flows at the other side of membrane 22. Arrows 24 show the direction of water transport by osmosis across membrane 22. An output stream 25 consisting of original input stream 23 now containing less water, leaves osmosis unit 21. An output stream 26 consisting of original input stream 20 now containing a lower concentration of salt (due to the presence of the additional water from stream 23), leaves osmosis unit 21 via a turbine 27 which drives a generator 28 thus producing electricity.

Figure 7:
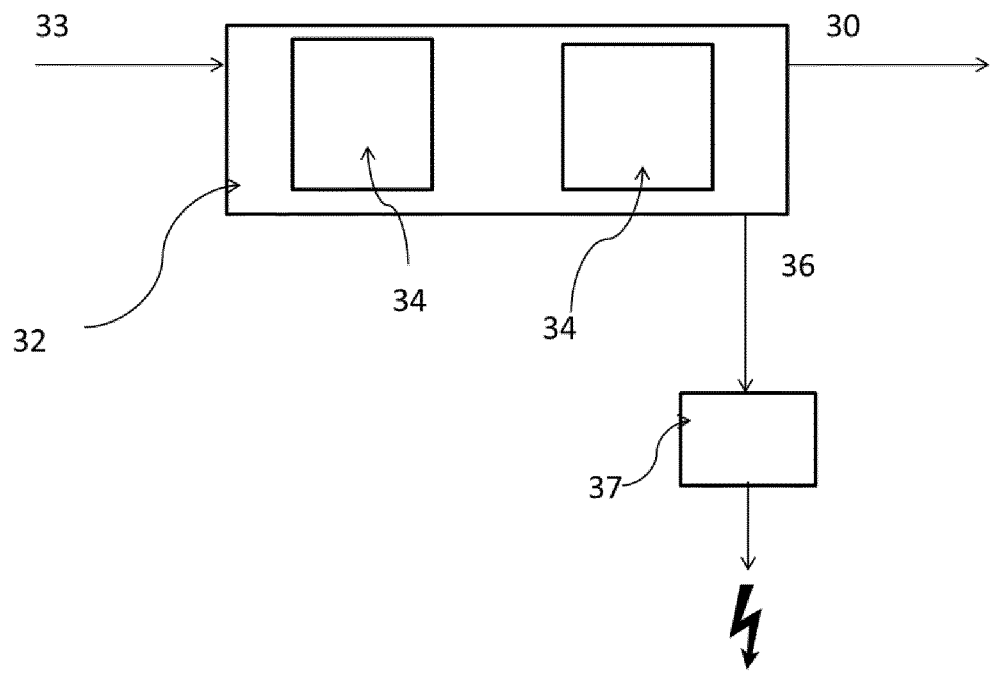
FIG. 7 shows a biogas power unit.

FIG. 7 shows more details of a biogas power unit 7 of FIG. 1. A sludge stream 33, for example sewage sludge (which may for example be stream 5 of FIG. 1) is passed to a biogas power unit 32 and flows into one or other of the two anaerobic digesters 34 contained therein. Within the airtight anaerobic digesters 34 microorganisms transform organic material contained in the wastewater into biogas (for example methane and carbon dioxide) and digestate. A biogas stream 36 is then passed to internal combustion engine 37 for example a gas turbine for the conversion of the biogas into electricity and/or heat. It will be understood that the biogas is a power source that can be used as required. A digestate stream 30 is output from the biogas power unit 32 for disposal as required.

The invention claimed is:

1. A process for the generation of power, the process comprising the steps of:
   receiving a wastewater stream containing organic matter;
   passing the wastewater stream to an anaerobic digester in which the organic matter contained therein is broken down to produce biogas; and
   wherein the liquid content of said wastewater stream is reduced before said stream enters the anaerobic digester by passing the wastewater stream through an osmotic power unit in which said stream is passed over one side of a semi-permeable membrane which permits the passage of water but not the passage of salts, an aqueous stream of higher salinity than said wastewater stream being passed over the other side of said membrane such that latent osmotic energy present in said aqueous stream of higher salinity is converted into electricity and wherein the process further comprises extracting a warm saline stream from a geothermal formation and using said saline stream as the aqueous stream of higher salinity.

2. A process as claimed in claim 1, in which the warm saline stream has a temperature of at least 45° C.

3. A process as claimed in claim 1, in which the warm saline stream has a temperature of at least 55° C.

4. A process as claimed in claim 1, in which the process further comprises extracting thermal energy from the warm saline stream.

5. A process as claimed in claim 1, in which the aqueous stream of higher salinity has a salt content of at least 10% wt.

6. A process as claimed in claim 5, in which the aqueous stream of higher salinity has a salt content of at least 15% wt.

7. A process as claimed in claim 1, in which the wastewater stream has a solids content of up to 5% wt prior to passage through the osmotic power unit.

8. A process as claimed in claim 7, in which the wastewater stream has a solids content in the range of 0.5 to 1.5% wt prior to passage through the osmotic power unit.

9. A process as claimed in claim 7, in which the wastewater stream has a solids content in the range of 4 to 8% wt following passage through the osmotic power unit.

10. A process as claimed in claim 1, in which the electricity generated by the osmotic power unit is used to power other steps in the wastewater treatment process.

11. A process as claimed in claim 1, in which the wastewater is municipal or industrial wastewater.

12. A process as claimed in claim 1, in which the wastewater is sewage.

13. A process as claimed in claim 1, in which the osmotic power unit contains more than one osmosis unit each comprising a semipermeable membrane which permits the passage of water but not the passage of salts.

14. A process as claimed in claim 13, in which an output stream from one osmosis unit is used as an input stream for a second osmosis unit.

15. A power generation system comprising:
   a connection to a wastewater stream;
   a connection to a warm saline stream extracted from a geothermal formation;
   a biogas power unit arranged to generate power by breaking down a sludge in an anaerobic digester;
   an osmotic power unit arranged to generate electricity through Pressure Retarded Osmosis (PRO) using the difference in salinity between the saline stream and the wastewater stream; and
   wherein the system is arranged such that the concentrated wastewater stream output by the osmotic power unit is passed to the biogas power unit for use as the sludge.

16. A process for the generation of power, the process comprising the steps of:
   extracting a warm saline stream from a geothermal formation;
   obtaining a wastewater stream containing organic matter;
   converting thermal energy present in the warm saline stream into electricity and/or using the thermal energy present in the warm saline stream to increase the temperature of the wastewater stream;
   converting latent osmotic energy present in said saline stream into electricity and reducing the water content of said wastewater stream by using (i) the wastewater as the low salinity feed stream of an osmotic power generation process and (ii) the saline stream as the high salinity feed stream of the osmotic power generation process; and
   sending the concentrated wastewater resulting from the osmotic power generation process to anaerobic digesters in which biogas is generated from the breakdown of organic matter contained in said wastewater.

17. A process for the generation of power, the process comprising:
   receiving a wastewater stream containing organic matter;
   passing the wastewater stream to an anaerobic digester in which the organic matter contained therein is broken down to produce biogas; and
   wherein a liquid content of said wastewater stream is reduced before said wastewater stream enters the anaerobic digester by passing the wastewater stream through an osmotic power unit in which said wastewater stream is passed over one side of a semi-permeable membrane which permits a passage of water but not a passage of salts, an aqueous stream of higher salinity than said wastewater stream being passed over a second side of said permeable membrane such that latent osmotic energy present in said aqueous stream of higher salinity is converted into electricity, said wastewater stream passing through the osmotic power unit co-current to said aqueous stream of higher salinity.

* * * * *